US011253923B2

(12) United States Patent
Herzog

(10) Patent No.: US 11,253,923 B2
(45) Date of Patent: Feb. 22, 2022

(54) SYSTEM FOR ADDITIVE PRODUCTION OF THREE-DIMENSIONAL OBJECTS

(71) Applicant: CL SCHUTZRECHTSVERWALTUNGS GMBH, Lichtenfels (DE)

(72) Inventor: Frank Herzog, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 358 days.

(21) Appl. No.: 15/924,059

(22) Filed: Mar. 16, 2018

(65) Prior Publication Data

US 2018/0264552 A1  Sep. 20, 2018

(30) Foreign Application Priority Data

Mar. 17, 2017  (DE) .......................... 102017105819.2

(51) Int. Cl.
*B22F 10/20* (2021.01)
*B29C 64/35* (2017.01)
(Continued)

(52) U.S. Cl.
CPC .............. *B22F 10/20* (2021.01); *B08B 13/00* (2013.01); *B22F 3/003* (2013.01); *B23K 26/34* (2013.01);
(Continued)

(58) Field of Classification Search
CPC ................................ B29C 64/35; B29C 64/259
See application file for complete search history.

(56) References Cited

U.S. PATENT DOCUMENTS

2004/0045941 A1   3/2004 Herzog et al.
2010/0006228 A1*  1/2010 Abe ....................... B33Y 30/00
                                                                    156/356
(Continued)

FOREIGN PATENT DOCUMENTS

CN        101541511 A    9/2009
CN        106738905 A    5/2017
(Continued)

OTHER PUBLICATIONS

European Search Report Corresponding to Application No. 17188873 dated Mar. 5, 2018

(Continued)

*Primary Examiner* — Leith S Shafi
*Assistant Examiner* — Inja Song
(74) *Attorney, Agent, or Firm* — Dority & Manning, P.A.

(57) ABSTRACT

System for the additive production of three-dimensional objects, comprising: —a device which is designed for the additive production of a three-dimensional object, wherein the device comprises a process chamber, within which additive construction processes for the additive production of three-dimensional objects can be carried out, —a powder module which can be docked to the process chamber of the at least one device, and which comprises a receiving chamber for receiving construction material that is to be solidified as part of an additive construction process or that is not solidified and/or a three-dimensional object that is to be additively produced or is additively produced as part of an additive construction process, —a cleaning module which can be docked to the process chamber of the at least one device and which comprises a cleaning device.

16 Claims, 2 Drawing Sheets

Figure 1:
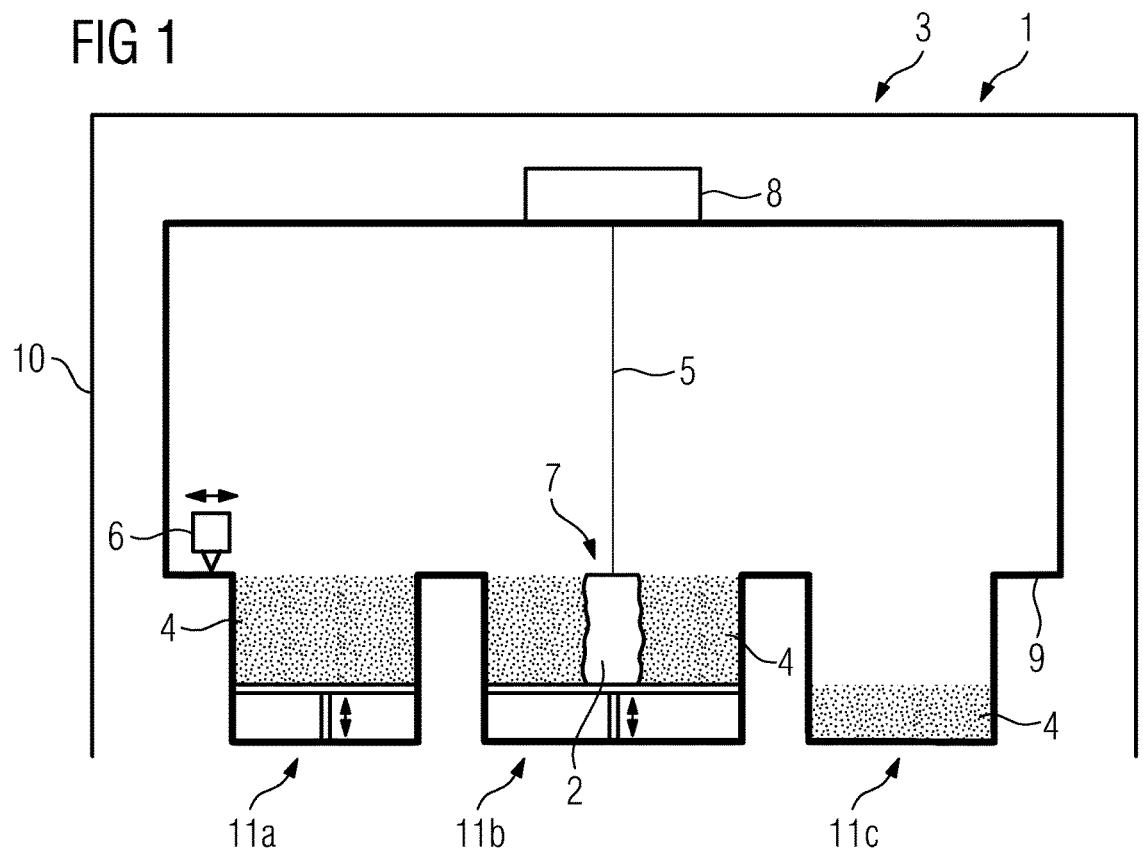

(51) Int. Cl.
    *B29C 64/259*     (2017.01)
    *B29C 64/153*     (2017.01)
    *B08B 13/00*     (2006.01)
    *B33Y 30/00*     (2015.01)
    *B33Y 40/00*     (2020.01)
    *B23K 26/354*     (2014.01)
    *B22F 3/00*     (2021.01)
    *B23K 26/34*     (2014.01)

(52) U.S. Cl.
    CPC .......... *B23K 26/354* (2015.10); *B29C 64/153* (2017.08); *B29C 64/259* (2017.08); *B29C 64/35* (2017.08); *B33Y 30/00* (2014.12); *B33Y 40/00* (2014.12); *Y02P 10/25* (2015.11)

(56) References Cited

U.S. PATENT DOCUMENTS

| | | | |
|---|---|---|---|
| 2015/0314389 A1* | 11/2015 | Yamada | B23K 15/0086 219/76.1 |
| 2016/0243618 A1 | 8/2016 | Heugel et al. | |

FOREIGN PATENT DOCUMENTS

| | | |
|---|---|---|
| DE | 20122294 U | 3/2005 |
| DE | 102009036153 A1 | 2/2011 |
| DE | 102013219961 A1 | 4/2015 |
| DE | 102013223411 A1 | 5/2015 |
| DE | 112008000027 B4 | 5/2015 |
| JP | H07108160 A | 4/1995 |
| JP | 2004516166 A | 6/2004 |
| JP | 2008/546572 A | 12/2008 |
| JP | 2010132960 A | 6/2010 |
| JP | 2015/205512 A | 11/2015 |
| JP | 2016/203624 A | 12/2016 |
| WO | WO2016/027123 A1 | 2/2016 |
| WO | 2016103686 A1 | 6/2016 |
| WO | 2017050860 A1 | 3/2017 |

OTHER PUBLICATIONS

Machine Translated Japanese Search Report Corresponding to Application No. 2018004149 dated Jan. 15, 2019

German Search Report Corresponding to Application No. 102017105819 dated Mar. 25, 2019.

European Search Report Corresponding to Application No. 19161483 dated May 28, 2019.

Combined Chinese Search Report and Office Action Corresponding to Application No. 20170767988 dated Nov. 14, 2019.

European Office Action Corresponding to Application No. 19161483 dated Jun. 30, 2020.

* cited by examiner

SYSTEM FOR ADDITIVE PRODUCTION OF THREE-DIMENSIONAL OBJECTS

CROSS-REFERENCE TO RELATED APPLICATIONS

This application claims priority to German Patent Application serial no. 10 2017 105 819.2 filed Mar. 17, 2017, the contents of which are incorporated herein by reference in their entirety as if set forth verbatim.

BACKGROUND

The invention relates to a system for the additive production of three-dimensional objects.

Such systems for the additive production of three-dimensional objects are generally known. Corresponding systems comprise, inter alia, devices for the additive production of three-dimensional objects. The three-dimensional objects to be additively produced are produced by means of corresponding devices. Corresponding devices typically comprise a process chamber, within which additive construction processes for the additive production of three-dimensional objects can be carried out. Different functional components of the device, such as a coater device comprising a coater element that is movable relative to a construction plane, can be arranged within the process chamber.

The use of powder modules that can be docked to the process chamber is known in corresponding systems. Corresponding powder modules typically comprise a powder chamber delimiting a powder chamber volume, for receiving construction material that is to be solidified as part of an additive construction process or that is not solidified, or a three-dimensional object that is to be produced or is produced as part of an additive construction process.

Corresponding process chambers—the same applies for functional components arranged or formed within corresponding process chambers—can be contaminated by contaminants, particularly those that are process-created. Corresponding contaminants can have a negative effect on the operation of the device or the respective functional components, by influencing the properties of an energy beam used for additive production, for example.

SUMMARY

The problem to be solved by the invention is that of describing a system for the additive production of three-dimensional objects that is improved, particularly in respect of a flexible and feasible cleaning option of respective process chambers or respective functional components arranged or formed in respective process chambers.

This problem is solved by a system for the additive production of three-dimensional objects according to the claims. The dependent claims relate to special embodiments of the system.

The system described herein serves in general for the additive or generative production of three-dimensional objects; that is, technical components or technical component groups, for example.

The system comprises at least one device (abbreviated as "device" in the following) for the additive production of at least one three-dimensional object (abbreviated as "object" in the following) by successive, layered, selective exposure and accompanying successive, layered, selective solidification of construction material layers to be selectively solidified of a construction material that can be solidified by means of at least one energy beam (4). The construction material that can be solidified can be a metal, plastic and/or ceramic powder. A metal, plastic or ceramic powder can also be understood to be a powder mixture of different metals, plastics or ceramics. The energy beam can be a laser beam. The device can accordingly be an SLM device for carrying out selective laser melting processes (abbreviated as SLM process) or an SLS device for carrying out selective laser sintering processes (abbreviated as SLS process). The system can accordingly be a system for carrying out selective laser melting processes or a system for carrying out selective laser sintering processes. The energy beam can also be an electron beam, however. It is thus also conceivable that the system or device can be a system or a device for carrying out selective electron beam melting processes (abbreviated as SEBS process).

The successively layered selective exposure and the associated successively layered selective solidification of the construction material layers to be solidified in order to additively produce an object occur on the basis of object-based construction data. In general, the construction data describe the geometric design of the object to be additively produced. The construction data can be "sliced" data of the object to be produced, for example, or can contain such data.

Each device associated with the system comprises all of the functional components typically required for carrying out additive construction processes. Corresponding functional components include, for example, a coater device for forming construction material layers to be selectively exposed in a construction plane and an exposure device comprising one or more exposure elements, designed as or comprising laser beam generation or laser beam deflection elements, for example, in order to generate an energy beam for the selective exposure of a construction material layer that is formed by means of the coater device in a construction plane and that is to be selectively exposed, and thus is to be selectively solidified. The functional components are typically arranged in a housing structure of the device, which is also designated as or can be considered to be a machine housing as applicable and which can typically be inertized, that is, particularly in a process chamber of the device that can typically be inertized.

The system furthermore comprises at least one powder module that can be docked to a process chamber of a device as required, that is, that can be mechanically connected thereto as required. In general, the powder module can be any powder module that is designed to receive and/or to dispense construction material and/or to receive an object that is to be additively produced or is additively produced. In particular, the powder module can be a construction module in which the actual additive construction of three-dimensional objects occurs and which is filled successively in layers with construction material to be selectively solidified while carrying out the additive construction processes, or a dosing module via which construction material is dosed into the process chamber during the additive construction processes, or a catch or overflow module that is filled with construction material that is not to be solidified while carrying out the additive construction processes. In order to implement a docking of a powder module to a process chamber of a device when required, there are interfaces (docking interfaces), particularly mechanical interfaces, which are suitable both for the powder module side and the process chamber side. Corresponding interfaces can consequently be formed as or comprise guide elements interacting, for example, on the powder chamber or process chamber side, that is, intermeshing with each other, for example.

Respective interfaces on the process chamber side are typically arranged or formed in the region of respective docking positions on the process chamber side. A powder module and/or a cleaning module can dock to corresponding docking positions.

A corresponding powder module comprises a powder chamber for receiving construction material that is to be selectively solidified as part of an additive construction process or that is not solidified and/or an object that is to be additively produced or is additively produced. The powder chamber adjoins a powder chamber volume that can be filled with construction material. The powder chamber volume is delimited at least laterally by powder chamber walls of the normally (hollow) cuboid or (hollow) cylindrical powder chamber. On the floor side, the powder chamber volume is delimited by a floor plate or a carrier plate of a carrier device. A carrier plate of a corresponding carrier device, insofar as it is present, is typically mounted movably between two end positions, that is, between an upper (relative to the height of the powder module) and a lower (relative to the height of the powder module) end position, relative to the powder chamber. The movable mounting of the carrier plate enables the implementation of a movement, particularly a linear movement of the carrier device in a vertical movement direction. The movable mounting of the carrier plate is implemented by a drive device coupled thereto. The drive device is designed to form or generate a force (driving force) moving the carrier plate in a corresponding movement. The drive device can be (electro) mechanical, hydraulic or pneumatic, for example.

In respect of the aforementioned problem of contamination of corresponding process chambers or functional components arranged or formed within corresponding process chambers by contaminants, particularly process-created contaminants, the system comprises at least one cleaning module that can be docked or coupled to the process chamber of a device. As mentioned, the cleaning module can dock to docking positions on the process chamber side. The cleaning module comprises a cleaning device which is designed for the automatable or automated cleaning at least in sections, particularly in full, of the process chamber or a functional component of the device that is arranged or formed within the process chamber.

The docking of a cleaning module to a process chamber on the device side when required and the commissioning of a cleaning device on the cleaning module side provides a flexible and practicable cleaning possibility of respective process chambers or respective functional components arranged or formed in respective process chambers. A cleaning of a process chamber or a functional component arranged or formed in a process chamber is particularly understood to be a chemical and/or physical removal of process-created deposits on the process chamber walls delimiting a process chamber interior space of the process chamber and/or on the functional component walls defining, particularly exposing, an outer shape of a respective functional component, or includes the cleaning of such.

A cleaning device can comprise a flow device, which is designed to generate a cleaning flow that flows through the process chamber of a device at least in sections, particularly in full, and/or to generate a cleaning flow that flows around a functional component of the device that is arranged or formed in a process chamber of a device, at least in sections, particularly in full. The flow device is particularly designed to guide a cleaning flow, in a circuit-like manner as applicable, along the process chamber walls delimiting a process chamber interior space of a process chamber and/or along the functional component walls defining, particularly exposing, an outer shape of a respective functional component. In order to generate a corresponding cleaning flow, the flow device can comprise a suction and/or blowing device. A corresponding cleaning flow can specifically be formed by a cleaning fluid charged with chemically and/or physically active cleaning substances. Corresponding cleaning substances can be (lightly) abrasive particles, for example. A cleaning flow can have anti-static substances (anti-static agents) in order to prevent a static charging in connection with a cleaning process.

Alternatively or in addition to a corresponding flow device, a cleaning device can comprise a wiper device, which is designed to generate a wiping motion of a wiper element that can be displaced in a wiping motion along a surface of a process chamber that is to be cleaned and/or a functional component arranged or formed in the process chamber. The wiper device is particularly designed to guide a wiper element along the process chamber walls delimiting a process chamber interior space of a process chamber and/or along the functional component walls defining, particularly exposing, an outer shape of a respective functional component. A corresponding wiper element can have a cleaning-active, that is, particularly a friction-active, textile-like surface, which is, on the one hand, suitable so that corresponding contaminants can be received from a contaminated surface and is, on the other hand, suitable so that the surface to be cleaned is not damaged. A wiper element can have anti-static substances (anti-static agents) in order to prevent a static charging in connection with a cleaning process.

The cleaning device can comprise at least one cleaning arm that is movable, translationally and/or rotationally, for example, in at least one degree of freedom relative to a surface of a process chamber that is to be cleaned and/or a functional component arranged or formed in the process chamber. A functional element forming part of the flow device and/or the wiper device can be arranged or formed on the cleaning arm. A corresponding functional element can be, for example, a suction and/or blowing element of a suction and/or blowing device associated with a flow device, comprising one or more nozzles, and/or a wiper element of a wiper device. A corresponding cleaning arm can be moved particularly between a non-operating position, in which said cleaning arm does not protrude over the outer dimensions of the cleaning module, and an operating position, in which said cleaning arm typically protrudes over the outer dimensions of the cleaning module, particularly in order to reach corresponding surfaces that are to be cleaned. The movable mounting of the cleaning arm, which can specifically be a robot arm, for example, is implemented by a drive device coupled thereto. The drive device is designed to form or generate a force (driving force) moving the cleaning arm in a corresponding movement. The drive device can be (electro)mechanical, hydraulic or pneumatic, for example.

Like a powder module, a cleaning module can be designed to be (hollow) cuboid or (hollow) cylindrical; a cleaning module can consequently comprise a cuboid or cube-shaped main body, for example. In particular, it is possible that a cleaning module having the same outside dimensions as a powder module is designed so that all cleaning and powder modules of the system have identical, particularly standardized outside dimensions, so that all cleaning and powder modules can be docked to a process chamber via the same mechanical interfaces.

As mentioned, the cleaning module can comprise a main body, particularly a cuboid or cube-shaped main body. The cleaning device can be arranged or formed in the main body, so that the result is the possibility of very compact integration of the cleaning device into a cleaning module.

A receptacle device for receiving contaminants removed during a cleaning process can furthermore be arranged or formed on or in a main body of the cleaning device. In addition to the cleaning function, the cleaning module can thus also have a receiving or collecting function for removed contaminants, so that it is ensured that said contaminants are removed from the process chamber.

A cleaning module can be movable and thus moved in or within the system, particularly between different devices or work stations of the system. In order to move the cleaning module, it can be equipped with guides, wheels, rollers, etc., for example. Movements of a cleaning module within an (optional) tunnel structure associated with the system are described below in greater detail. Similarly, it is naturally also conceivable that powder modules are movable and thus can be moved in or within the system, particularly between different work stations of the system. Corresponding work stations of the system can be, for example, construction or process stations formed by corresponding devices, in which the actual additive production of objects occurs, unpacking stations, in which additively produced objects are "unpacked" from the construction material surrounding them, or filling stations, in which respective powder modules are filled or emptied.

The system can comprise a tunnel structure. The tunnel structure typically connects at least two work stations of the system to each other. The tunnel structure has at least one, particularly tunnel tube-like or tunnel tube-shaped tunnel section, in which or through which at least one cleaning and/or powder module is movable. The tunnel section typically extends between at least two work stations of the system. At least one trajectory or movement track ("trajectory" hereinafter), along which a cleaning or powder module is movable through the tunnel section, is formed or arranged in a respective tunnel section. Of course, it is possible to form or arrange a plurality of trajectories in a tunnel section, that is, for example, adjacent, particularly parallel arranged trajectories in one or more planes. A corresponding trajectory can enable a guided movement of a cleaning or powder module in the or through the respective tunnel section.

The function of the tunnel structure or the tunnel sections associated with said tunnel structure is, as mentioned, to directly or indirectly connect at least two different work stations of the system to each other, that is, for example, with the interconnection of at least one additional tunnel section and/or an additional work station of the system. The connection of respective work stations of the system enables a moving back and forth of respective cleaning or powder modules between respective work stations of the system. Movements of respective cleaning or powder modules through the tunnel structure are possible, particularly fully automatically. A construction or process station associated with the system can be connected to an additional construction or process station associated with the system and/or an unpacking station associated with the system via one or more tunnel sections, for example.

It is generally possible that the trajectory along which a cleaning or powder module is moved, proceeding from a first work station of the system, back into an additional work station of the system, is equal or unequal to the trajectory along which the cleaning or powder module was moved, proceeding from the first work station, into the additional work station. The selection of a trajectory of a cleaning or powder module between respective work stations of the system can occur on the basis of specific prioritizations of specific cleaning or powder modules. For higher-prioritized cleaning or powder modules, shorter or faster trajectories can be selected than for lower-prioritized cleaning or powder modules. Likewise, higher-prioritized cleaning or powder modules can be moved at a speed that is higher in comparison to lower-prioritized powder modules.

In order to move respective cleaning or powder modules, the system comprises at least one conveyor device. The conveyor device can be coupled to a (motorized) drive device, via which a driving force moving at least one cleaning or powder module can be generated.

The conveyor device can comprise at least one means of conveyance, arranged or formed on the tunnel structure side, which is designed to move a cleaning or powder module. Such a means of conveyance can be, for example, a mechanical means of conveyance, that is, for example, a belt, chain or roller conveyor, which defines a conveying line and thus a trajectory by the spatial extension thereof within a respective tunnel section, along which a cleaning or powder module is movable. A corresponding means of conveyance can be arranged or formed on the floor, ceiling or side wall side on a wall of the tunnel section, for example.

The or a conveyor device can comprise at least one means of conveyance, arranged or formed on the cleaning or powder module side, which is designed to move the cleaning or powder module equipped therewith. Such a means of conveyance can be, for example, an (electro)motorized drive device integrated in a respective cleaning or powder module. The freedom of movement of a cleaning or powder module can thus be expanded as applicable, since rotation movements about a vertical axis are possible, for example.

The control of all movements of the cleaning or powder modules movable or moved in the system, particularly in the tunnel structure, occurs via a central control device, which communicates expediently directly or indirectly with respective cleaning or powder modules, which can be equipped with suitable communications devices for this purpose, such as radio-based communications devices, for example. All information relevant for the movement of respective cleaning or powder modules within the system or the tunnel structure is present in the central control device, that is, particularly respective movement information, that is, for example, velocity information, respective position information, that is, start and destination information, respective prioritization information, etc. The control of movements of the cleaning or powder modules moved in the system or in the tunnel structure can occur fully automatically.

A respective tunnel section of the tunnel structure delimits at least one hollow chamber, in which or through which at least one cleaning or powder module is movable. Moreover, the geometric design of a respective tunnel section can be chosen arbitrarily, with the stipulation that at least one cleaning or powder module is movable in or through said tunnel section. A respective tunnel section can have a round, rounded or angular cross-section surface, for example. In respect of the longitudinal extension thereof, a respective tunnel section can be designed to extend in a straight line, at least in sections, particularly in full, or bent or curved at least in sections, particularly in full. A respective tunnel section can naturally be formed from a plurality of tunnel section segments, which can be connected or are connected to each other to form the respective tunnel section.

A respective tunnel section can open into at least one additional tunnel section extending at an angle thereto, for example. The tunnel structure can—similarly to a track or rail system known from railway traffic—comprise a plurality of tunnel sections opening into each other at defined positions. A plurality of tunnel sections can extend adjacent, above or below each other, at least in sections. The tunnel structure can thus comprise a plurality of tunnel sections extending adjacent, above or below each other, and thus in different (horizontal and/or vertical) planes, at least in sections.

A respective tunnel section can be inertizable, that is, an inert atmosphere can be formed and maintained therein. In a similar way, a specific pressure level, that is, for example, a positive or negative pressure, can be formed and maintained in a respective tunnel section. The same applies for the entire tunnel structure.

In order to be able to be connected to the tunnel structure, individual, a plurality or all work stations of the system can have a connection section, via which said work stations can be connected or are connected to the tunnel structure. For example, a device can have at least one connection section, via which said device can be connected or is connected to the tunnel structure. Cleaning or powder modules can thus be movable proceeding from a device into the tunnel structure or proceeding from the tunnel structure into a device via corresponding connection sections, for example.

The invention also relates to a cleaning module for a system as described. All comments in connection with the system apply analogously for the cleaning module.

BRIEF DERSCRIPTION OF THE DRAWINGS

Figure 2:
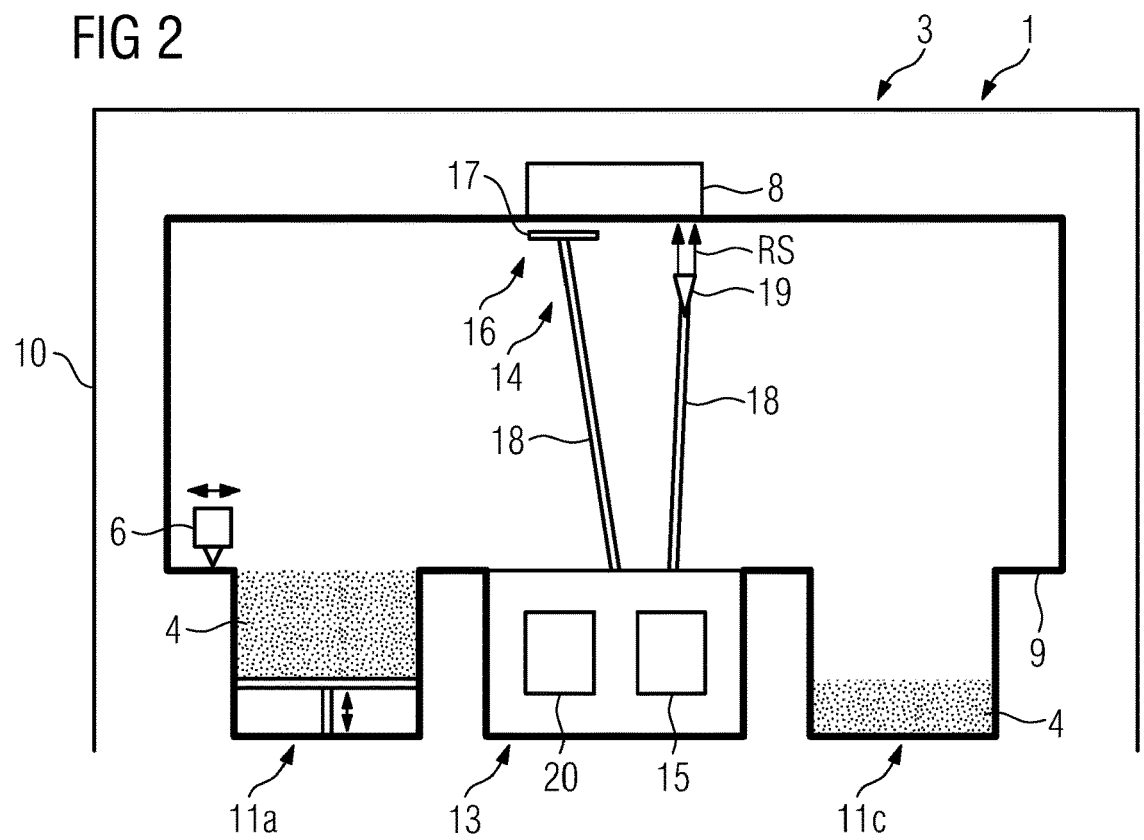
Figure 3:
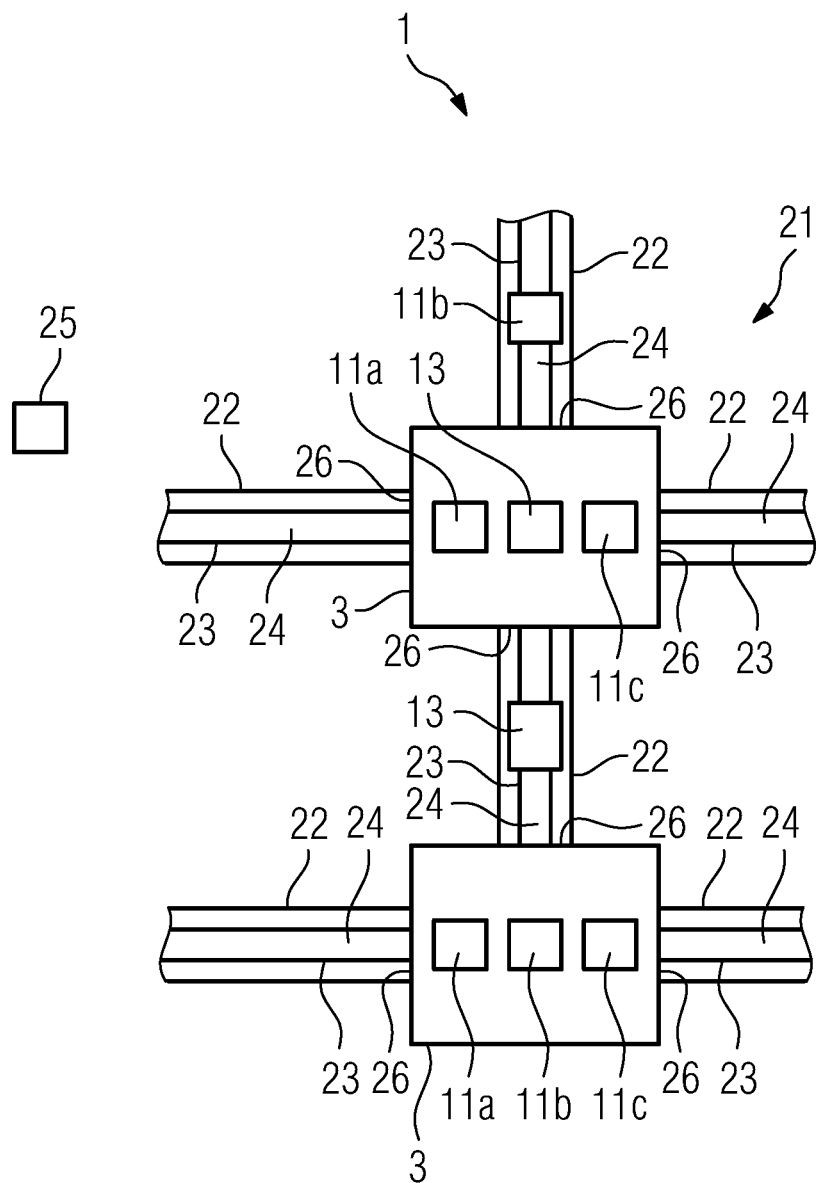

The invention is explained in more detail based on embodiments in the figures. They show:

FIGS. 1, 2 each a schematic diagram of a section of a system for additive production of three-dimensional objects according to an embodiment; and FIG. 3 a schematic diagram of a system for additive production of three-dimensional objects according to an additional embodiment.

FIGS. 1 and 2 show a schematic diagram of a section of a system 1 for additive production of three-dimensional objects 2, that is, for example, technical components or technical component groups, according to an embodiment in a schematic side view.

DETAILED DESCRIPTION

The system 1 comprises, in a basic configuration, a device 3 ("construction or processing station") for the additive production of three-dimensional objects 2 by successively layered, selective exposure and accompanying successively layered, selective solidification of individual construction material layers of a construction material 4 that can be solidified by means of an energy beam 5 (more precise functional details of the device 3 result from FIG. 2). The construction material 4 that can be solidified can be a metal powder, for example. The energy beam 5 can be a laser beam. The device 3 can accordingly be a device for carrying out selective laser melting processes (abbreviated as SLM process) or selective laser sintering processes (abbreviated as SLS process). The system 1 can accordingly be a system for carrying out selective laser melting processes (abbreviated as SLM process) or selective laser sintering processes (abbreviated as SLS process). In principle, however, it is also conceivable that the system 1 can be a system for carrying out selective electron beam melting processes (abbreviated as SEBS process).

The devices 3 shown in the figures each comprise all of the functional components typically required for carrying out additive construction processes. Corresponding functional components include, for example, as indicated by the horizontal double arrow, a movably mounted coater device 6 for forming construction material layers to be selectively exposed in a construction plane 7 and an exposure device 8 comprising one or more exposure elements (not shown), designed as or comprising laser diode elements, for example, in order to generate an energy beam 5 for the selective exposure of a construction material layer that is formed by means of the coater device 6 in the construction plane 7 and that is to be selectively exposed. The functional components are arranged in a housing structure 10 of the device 3 comprising a process chamber 9. The process chamber 9 can be inertized; consequently, a protection gas atmosphere, such as an argon atmosphere, and/or a specific pressure level can be formed and maintained in the process chamber 9.

The system 1 comprises a plurality of powder modules 11 $a$-11 $c$, which are designed to receive and/or dispense construction material 4. The following powder modules 11 $a$-11 $c$ are shown in the figures: a construction module 11 $b$, in which the actual additive construction of three-dimensional objects 2 occurs and which is filled successively in layers with construction material 4 to be selectively solidified while carrying out the additive construction processes, a dosing module 11 $a$, via which construction material 4 is dosed into the process chamber 9 during the additive construction processes, and a catch or overflow module 11 $c$ that is filled with construction material 4 that is not to be solidified while carrying out the additive construction processes.

Each powder module 11 $a$-11 $c$ comprises a powder chamber (not denoted in greater detail) for receiving construction material 4 that is to be selectively solidified as part of a construction process or that is not solidified and/or an object 2 that is to be additively produced or is additively produced 2. A respective powder chamber adjoins a powder chamber volume that can be filled with construction material 4. The powder chamber volume is delimited at least laterally by powder chamber walls of the normally hollow cuboid or hollow cylindrical powder chamber. On the floor side, the powder chamber volume is delimited by a floor plate (not denoted) or a carrier plate (not denoted) of a carrier device. A corresponding carrier plate of a carrier device is typically mounted movably between two end positions, that is, between an upper (relative to the height of the powder module 11 $a$-11 $c$) and a lower (relative to the height of the powder module 11 $a$-11 $c$) end position, relative to the powder chamber. The movable mounting of the carrier plates enables the implementation of a movement of the carrier plates along a vertical movement direction indicated by the vertical double arrow. The movable mounting of the carrier plates is implemented by a drive device (not denoted in greater detail) coupled to the respective carrier plate. The drive devices can be (electro)mechanical, hydraulic or pneumatic, for example.

In addition to the powder modules 11$a$-11$c$, the system 1 also comprises one or more cleaning modules 13 that can be docked to the process chamber 9 of a device, as shown in FIG. 1.

A respective cleaning module 13 is designed to have the same outside dimensions as a powder module 11$a$-11$c$, so that all cleaning modules 13 and powder modules 11$a$-11$c$ of the system 1 have identical, particularly standardized outside dimensions. All cleaning modules 13 and powder modules 11a-11c can thus be docked to a process chamber 9 via the same mechanical interfaces.

Each cleaning module 13 comprises a cleaning device 14 which is designed for the automatable or automated cleaning of the process chamber 9 or a functional component of the device 3 that is arranged or formed within the process chamber 9. A cleaning of a process chamber 9 or a functional component arranged in a process chamber 9 is particularly understood to be a chemical and/or physical removal of process-created deposits on the process chamber walls (not denoted) delimiting a process chamber interior space of the process chamber 9 and/or on the functional component walls defining, particularly exposing, an outer shape of a respective functional component.

Based on FIG. 2, which shows a cleaning module 13 docked to a process chamber 9 of the device 3, it is evident that a cleaning device 14 can comprise a flow device 15, which is designed to generate a cleaning flow RS that flows through the process chamber 9 of the device 3 or a cleaning flow RS that flows around a functional component of the device 3 that is arranged in the process chamber 9 of the device 3. In order to generate a corresponding cleaning flow RS, the flow device 15 can comprise a suction and/or blowing device.

Alternatively or in addition—a flow device 15 and a wiper device 16 are shown in this respect in FIG. 2, for example—to the flow device 15, a cleaning device 13 can comprise a wiper device 16, which is designed to generate a wiping motion of a wiper element 17 that can be displaced in a wiping motion along a surface of the process chamber 9 and/or a functional component arranged in the process chamber 9. The wiper element 17 can have a cleaning-active, that is, particularly a friction-active, textile-like surface, which is, on the one hand, suitable so that corresponding contaminants can be received from a contaminated surface and is, on the other hand, suitable so that the surface to be cleaned is not damaged.

The cleaning device 14 comprises a plurality of cleaning arms 18 that are movable, translationally and/or rotationally, for example, in at least one degree of freedom. A functional element forming a part of the flow device 15 or the wiper device 16 is arranged on a respective cleaning arm 18. A corresponding functional element can be, for example, a suction and/or blowing element 19 of a suction and/or blowing device (not shown) associated with the flow device 15, comprising one or more nozzles, or the wiper element 17 of the wiper device 16. A respective cleaning arm 18 can be moved particularly between a non-operating position, in which said cleaning arm does not protrude over the outer dimensions of the cleaning module 13, and an operating position, shown in FIG. 2, in which said cleaning arm typically protrudes over the outer dimensions of the cleaning module 13, particularly in order to reach corresponding surfaces that are to be cleaned. The movable mounting of a respective cleaning arm 18, which can specifically be a robot arm, for example, is implemented by a drive device (not shown) coupled thereto. The drive device can be (electro)mechanical, hydraulic or pneumatic, for example.

Like a powder module 11a-11c, a cleaning module 13 is designed to be (hollow) cuboid or (hollow) cylindrical; a cleaning module 13 consequently comprises a cuboid or cube-shaped main body, for example. The cleaning device 14 can be seen arranged on or in the main body. A receptacle device 20 for receiving contaminants removed during a cleaning process can furthermore be arranged on or in the main body. The cleaning module 13 thus also has a receiving or collecting function for removed contaminants, in addition to the cleaning function.

FIG. 3 shows a schematic diagram of a system 1 for additive production of three-dimensional objects 2, that is, for example, technical components or technical component groups, according to an embodiment in a schematic top view. Based on FIG. 2, it is evident that respective powder modules 11a-11c and cleaning modules 13 can be moved back and forth between different work stations of the system 1, which are stationary, that is, immovable components of the system 1 that are typically permanently connected to a subsurface.

The system 1 comprises a tunnel structure 21. The tunnel structure 21 has a plurality of tube-like or tube-shaped tunnel sections 22, in which or through which the powder modules 11a-11c and the cleaning modules 13 are movable. At least one trajectory 23 along which a powder module 11a-11c or a cleaning module 13 is movable through the tunnel section 22, is formed or arranged in a respective tunnel section 22. A corresponding trajectory 23 enables a guided movement of a powder module 11a-11c or a cleaning module 13 in the or through the respective tunnel section 22. The tunnel sections 22 can be inertized, that is, for example, an inert atmosphere having a specific pressure level, that is, for example, a positive or negative pressure, can be formed and maintained therein.

The function of the tunnel structure 21 is to connect different work stations of the system 1, that is, for example, construction or processing stations (devices 3) to each other directly or indirectly, that is, for example, with the interconnection of at least one tunnel section 22 and/or an additional work station of the system 1. The connection of respective work stations of the system 1 enables a moving back and forth of respective cleaning or powder modules 11a-11c between respective work stations of the system 1. Movements of respective powder modules 11a-11c or respective cleaning modules 13 through the tunnel structure 21 are possible, fully automatically.

In order to move respective powder modules 11a-11c or respective cleaning modules 13, the system 1 comprises a conveyor device 24 coupled to a (motorized) drive device (not shown), via which a driving force moving a powder module 11a-11c or a cleaning module 13 can be generated. The conveyor device 24 can comprise means of conveyance, arranged or formed on the tunnel structure side (not shown), which is designed to move a powder module 11a-11c. The means of conveyance can be, for example, a mechanical means of conveyance, that is, for example, a belt, chain or roller conveyor, which defines a conveying line and thus the trajectory 23 by the spatial extension thereof within a respective tunnel section 22, along which a powder module 11a-11c or a cleaning module 13 is movable.

It is also conceivable that the conveyor device 24 comprises means of conveyance arranged or formed on the powder module or cleaning module side, which are designed to move the powder modules 11a-11c or cleaning modules 13 equipped therewith. Such a means of conveyance can be, for example, an (electro)motorized drive device integrated in a respective powder module 11a-11c or a respective cleaning module 13. The freedom of movement of a powder module 11a-11c or a cleaning module 13 can thus be expanded, since rotation movements about a vertical axis are possible, for example.

The selection of a trajectory of one or more powder modules 11a-11c or cleaning modules 13 between respective work stations of the system 1 can occur on the basis of specific prioritizations of specific powder modules 11a-11c or cleaning modules 13. For higher-prioritized powder modules 11a-11c or cleaning modules 13, shorter or faster trajectories 23 can be selected than for lower-prioritized powder modules 11a-11c or cleaning modules 13. Likewise, higher-prioritized powder modules 11a-11c or cleaning modules 13 can be moved at a speed that is higher in comparison to lower-prioritized powder modules 11a-11c or cleaning modules 13.

The control of all movements of the powder modules 11a-11c or cleaning modules 13 moved in the system occurs via a central control device 25, which communicates expediently directly or indirectly with respective powder modules 11a-11c or cleaning modules 13, which can be equipped with suitable communications devices (not denoted in greater detail) for this purpose, such as radio-based communications devices, for example. All information relevant for the movement of powder modules 11a-11c or cleaning modules 13 within the tunnel structure 21 is present in the central control device 25, that is, particularly respective movement information, that is, for example, velocity information, respective position information, that is, start and destination information, respective prioritization information, etc. The control of movements of the powder modules 11a-11c or cleaning modules 13 moved in the tunnel structure 21 can occur fully automatically.

In order to be able to be connected to the tunnel structure 21, the work stations of the system 1 each have at least one connection section 26, via which said work stations can be connected or are connected to the tunnel structure 21. The connection section 26 represents an input or output region of the respective workstations of the system 1 into the tunnel structure 21 and of the tunnel structure 21 into the respective work stations.

Although not shown in the figures, tunnel sections 22 of the tunnel structure 21 can also be arranged or formed in respective work stations of the system 1, that is, for example, in the device 3, which communicate with a tunnel section 22 arranged or formed outside of the respective work station of the system 1 via respective connection sections 26. The tunnel structure 21 can thus (also) extend through corresponding work stations of the system 1.

The invention claimed is:

1. A system for additive production of three-dimensional objects, comprising:
    at least one device configured for the additive production of a three-dimensional object by successive, layered, selective exposure and accompanying successive, layered, selective solidification of construction material layers to be selectively solidified with energy beam,
    a process chamber of the at least one device, the process chamber configured for additive construction processes for the additive production of three-dimensional objects,
    at least one powder module configured for docking with the process chamber, the at least one powder module comprising a receiving chamber delimiting a powder chamber volume for receiving construction material that is to be solidified as part of an additive construction process or that is not solidified and/or a three-dimensional object that is to be additively produced or is additively produced as part of an additive construction process, and
    at least one cleaning module, configured for docking with the process chamber, the at least one cleaning module comprising a cleaning device configured for automatable or automated cleaning, at least in sections, of the process chamber or a functional component of the at least one device that is arranged or formed within the process chamber, wherein the cleaning device comprises a flow device configured to generate a cleaning flow that flows, at least in sections, through the process chamber and/or to generate a cleaning flow that flows around a functional component of the at least one device that is arranged or formed, at least in sections, in the process chamber of the at least one device,
    wherein the cleaning module has the same outside dimensions as the powder module, and the powder module and the cleaning module are movable with respect to the process chamber, so that the powder module and the cleaning module are exchangeable.

2. The system according to claim 1, wherein the cleaning device further comprises a wiper device configured to generate a wiping motion of a wiper element displaceable in the wiping motion along a surface of the process chamber that is to be cleaned and/or a functional component arranged or formed in the process chamber.

3. The system according to claim 2, wherein the cleaning device comprises at least one cleaning arm that is movable in at least one degree of freedom relative to a surface of the process chamber that is to be cleaned and/or a functional component arranged or formed in the process chamber, wherein a functional element forming a part of the wiper device is arranged or formed on the cleaning arm.

4. The system according to claim 1, wherein the cleaning device further comprises at least one cleaning arm that is movable in at least one degree of freedom relative to a surface of the process chamber that is to be cleaned and/or a functional component arranged or formed in the process chamber, wherein a functional element forming a part of the flow device is arranged or formed on the cleaning arm.

5. The system according to claim 1, wherein the cleaning module comprises a main body on or in which the cleaning device is arranged or formed.

6. The system according to claim 5, wherein the main body of the cleaning module is cuboid or cube-shaped.

7. The system according to claim 1, wherein the cleaning module comprises a main body on or in which a receptacle device for receiving contaminants removed during a cleaning process is arranged or formed.

8. The system according to claim 1, wherein the at least one cleaning module is movable within the system.

9. The system according to claim 8, wherein the at least one cleaning module is movable between a plurality of the at least one devices of the system.

10. The system according to claim 1, wherein the at least one powder module is movable within the system.

11. The system according to claim 10, wherein the at least one powder module is movable between a plurality of the at least one devices of the system.

12. The system according to claim 1, further comprising:
    a tunnel structure comprising at least one tunnel section in which the at least one powder module and/or the at least one cleaning module is movable, and
    at least one connection section of the at least one device configured to connect the at least one device with the tunnel structure through which the at least one powder module and/or the at least one cleaning module is movable between the at least one device and the tunnel structure.

13. The system according to claim 12, further comprising a conveyor device configured for the conveyance of the at least one powder module and/or the at least one cleaning module within the tunnel structure, wherein the conveyor device comprises at least mechanical conveyance, which is arranged or formed:

on a side of the tunnel structure; and/or on a side of the at least one powder module and/or the at least one cleaning module;

wherein the mechanical conveyance is configured to move the at least one powder module and/or the at least one cleaning module.

14. The system according to claim 1, wherein the cleaning device of the process chamber or a functional component arranged or formed in the process chamber comprises removing process-created deposits on at least one process chamber wall delimiting a process chamber interior space of the process chamber and/or on at least one functional component wall of the functional component defining an outer shape of the functional component.

15. The system according to claim 1, wherein the cleaning device is configured for the automatable or automated cleaning of an entirety of the process chamber or of the functional component of the at least one device that is arranged or formed within the process chamber.

16. The system according to claim 1, wherein the cleaning flow is entirely contained within the process chamber.

* * * * *